Oct. 22, 1957 E. C. MILLER 2,810,315
DIFFERENTIAL REFRACTOMETER CELL ASSEMBLY
Filed May 11, 1953 3 Sheets-Sheet 1

INVENTOR.
E. C. MILLER
BY Hudson and Young
ATTORNEYS

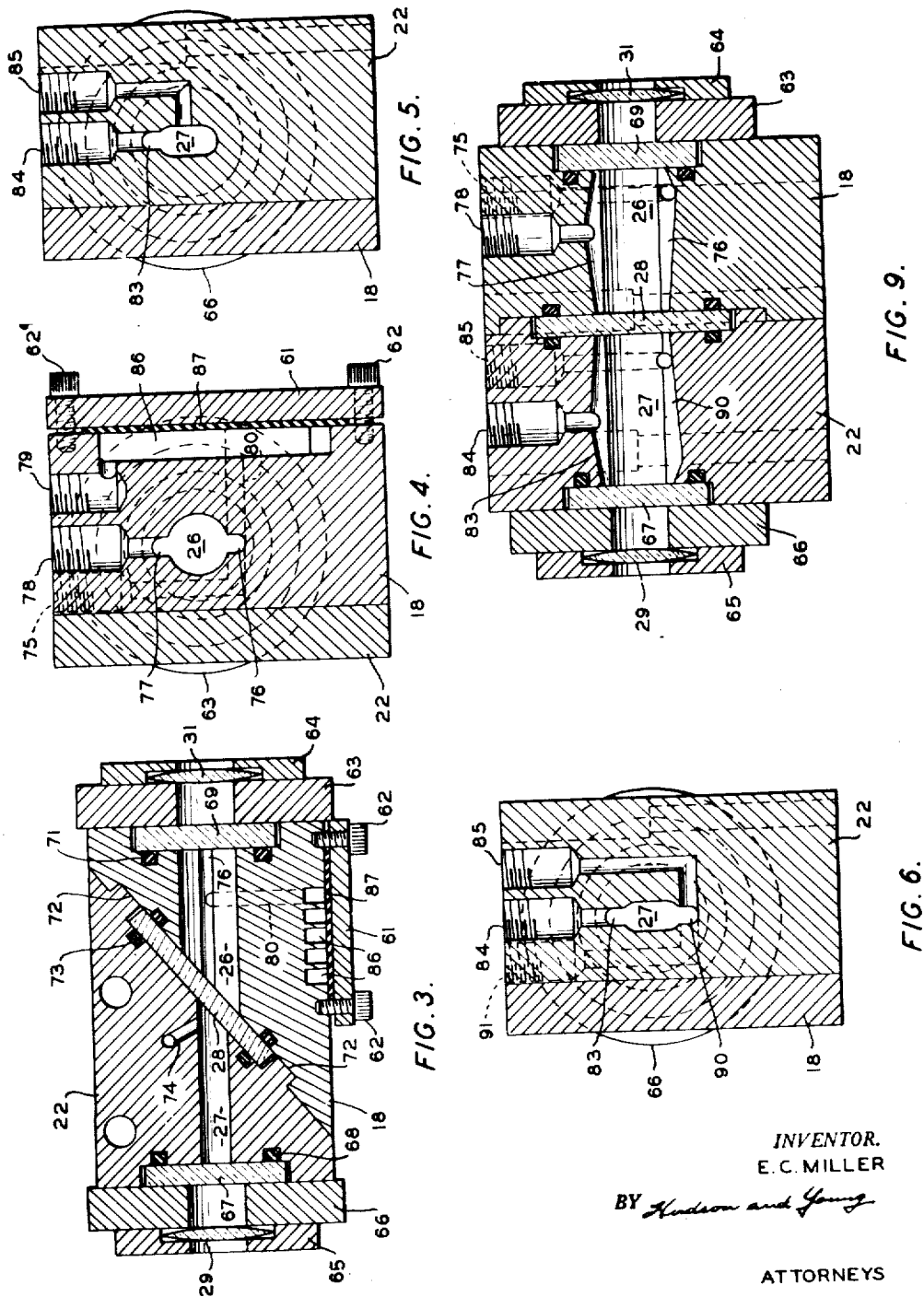

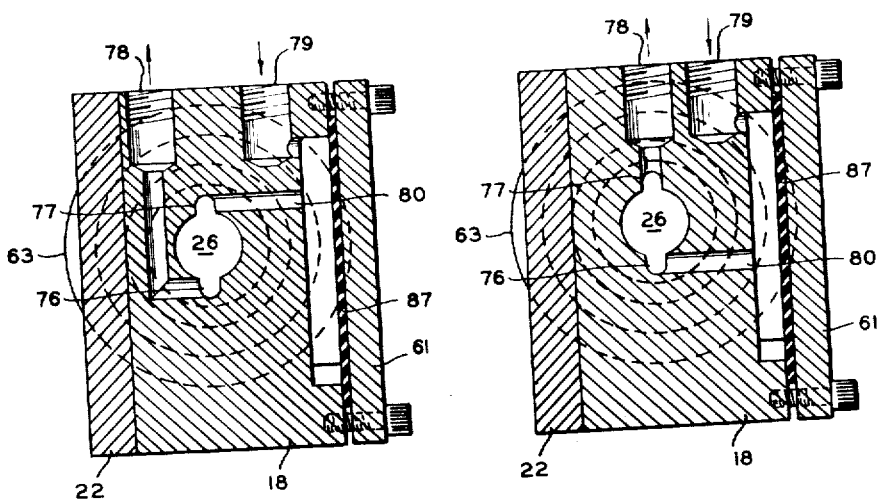

United States Patent Office 2,810,315
Patented Oct. 22, 1957

2,810,315

DIFFERENTIAL REFRACTOMETER CELL ASSEMBLY

Elmer C. Miller, Bartlesville, Okla., assignor to Phillips Petroleum Company, a corporation of Delaware Application May 11, 1953, Serial No. 353,984

35 Claims. (Cl. 88—14)

This invention relates to an improved differential refractometer. In one of its more specific aspects, this invention relates to the cell assembly of a differential refractometer.

The control of various types of industrial processes by the analysis of a sample stream with subsequent adjustment of a selected process variable in accordance with variations of a given property of the sample stream is well known. One specific method of control which may be employed involves the measurement of the refractive index of the sample stream and comparing same with the refractive index of a standard material. Any variation in composition of the sample stream as indicated by such a comparison can be utilized to actuate suitable control apparatus to adjust a selected process variable so as to return the composition of the sample stream to its desired value. Instead of using a standard material, it may be desirable to compare the refractive indexes of two sample streams so as to indicate differences in composition between the two streams or to control the composition of one stream in accordance with the composition of the other stream.

In an instrument used to detect differences in refractive indexes between two fluids, a refractometer cell is provided for deflecting the light beam by an amount proportional to the difference in refractive indexes of the two fluids contained therein. The value of the refractive index of a substance varies with temperature. It is important, therefore, if accurate measurements are to be obtained, that the two fluids in the cell be at substantially the same temperature. Furthermore, if the instrument is to give a true indication of the differential value between the refractive indexes of the two materials, it is imperative that no phases, either lighter or heavier than the sample or standard phases, be allowed to accumulate in the cell. Should such unwanted phases be permitted to gather in the cell, the passage of light therethrough will be interfered with, and the resultant reading of the instrument will be inaccurate. It is also desirable that the instrument be adaptable for use wtih different process streams of varying refractive characteristics. If no provision is made for such adaptation of the instrument, with a particular process stream the beam of light may be deflected out of the instrument, thus rendering it useless for the analysis of that stream.

In accordance with this invention, a differential refractometer is provided which is capable of detecting differences in refractive indexes between two fluids with a high degree of accuracy and which is adaptable for use with fluids having refractive characteristics varying over a wide range. The optical system of this refractometer includes a source of light, a slit and lens combination for collimating a narrow beam of said light, a cell assembly for deflecting the light beam by an amount proportional to the difference in refractive indexes of the two fluids contained therein, a rotatable dual prism assembly for reflecting the light beam emerging from said cell to a prism positioned in front of a dual radiation detection unit, a motor actuated by light impinging upon said detection unit and adapted to rotate the dual prism assembly until the light is focused upon the apex of the prism positioned in front of said detection unit, and means for indicating the degree of rotation of the dual prism assembly. While the refractometer cell assembly is being described in conjunction with a specific differential refractometer, it is to be understood that it is not intended to so limit the invention and that the cell assembly can be used with any instrument adapted to the measurement or comparison of the refractive indexes of two fluids. The refractometer cell assembly is formed from two complementary metal blocks which define interior passageways separated by a diagonal transverse plate of transparent material. The passageway extending through the sample cell block has an upper and a lower groove while the passageway through the standard cell block has an upper groove and may have a lower groove. The grooves, as will be explained more in detail hereinafter, provide for the automatic purging of unwanted phases which may accumulate in the sample or standard cell blocks. The sample cell block is further provided with a heat exchanger designed to ensure that the two fluids will be at substantially equal temperatures. The differential refractometer of this invention is supplied with changeable cell assemblies having the cell blocks cut at different angles, as, for example, 50°, 13°, and 4°, so as to permit adaptation of the instrument to the refractive characteristics of different process streams. By utilizing the refractometer cell assemblies of this invention, it is thus possible to eliminate unwanted and interfering fluid phases, to maintain the fluids at a substantially equal temperature, and to provide an instrument having a wide range of operation and a high degree of sensitivity.

The objects and advantages of this invention will be attained by the various aspects of the invention.

It is an object of this invention to provide a differential refractometer capable of detecting differences in refractive indexes between two fluids with a high degree of accuracy.

Another object of this invention is to provide a refractometer capable of detecting differences in refractive indexes between two fluids with a high degree of accuracy.

Another object of this invention is to provide a refractometer cell assembly which is automatically purged of unwanted interfering phases.

Still another object is to provide refractometer cell assemblies adapted to the refractive characteristics of a particular process stream.

A further object is to provide a differential refractometer having an improved cell assembly.

A still further object is to provide a refractometer cell assembly having an improved heat exchange means for controlling fluid temperatures.

Various other objects, advantages, and features of this invention should become apparent from the following description taken in conjunction with the accompanying drawing in which:

Figure 3 is a sectional view taken along line 3—3 of Figure 2.

Figure 4 is a sectional view taken along line 4—4 of Figure 2;

Figure 5 is a sectional view taken along line 5—5 of Figure 2;

Figure 6 is a sectional view showing a modification of the passageway of the standard cell block of Figure 2;

Figure 7 is a sectional view showing a modification of the sample cell block of Figure 2;

Figure 8 is a sectional view showing another modification of the sample cell block of Figure 2; and Figure 9 is a sectional view taken along line 9—9 of Figure 2, showing a modification of the invention wherein the gutters are tapered.

Figure 1:
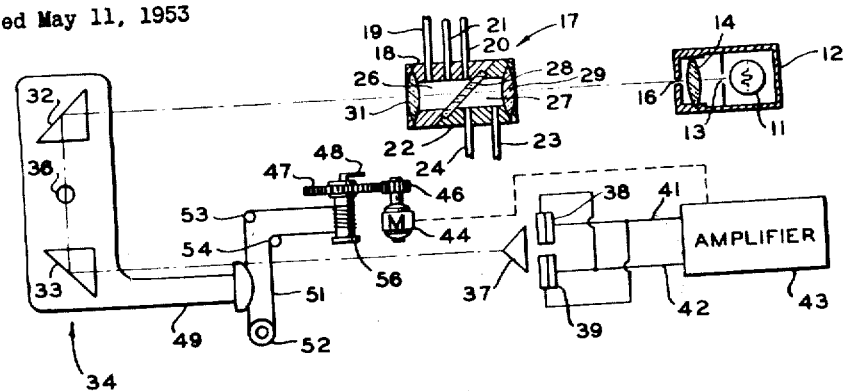
Figure 1 is a schematic representation of the differential refractometer according to this invention.

Referring in detail to the drawing and in particular to Figure 1, a source of light 11, which can be an ordinary incandescent bulb emitting radiation in the visible spectrum, is mounted in housing 12. Light emitted from source 11 passes through a first aperture 13 and thence through a converging lens 14. A narrow beam of light emerges from housing 12 through a second aperture 16 and is directed through a refractometer cell assembly 17. The purpose of aperture 13 is to reduce the total transmitted radiation from source 11, and to isolate the heat generated by source 11. The filament of source 11 is near the focal point of lens 14, but slightly therebeyond, while aperture 16 is disposed in close proximity to lens 14. Cell assembly 17 includes a sample cell block 18 provided with inlet conduit 19 and outlet conduits 20 and 21, and a standard cell block 22 provided with inlet and outlet conduits 23 and 24, respectively. Chambers 26 and 27 formed within the cell blocks are separated by a diagonal transverse plate 28 constructed of a material such as glass which is transparent to the light beam from source 11. A converging lens 29 defines one opening of chamber 27 while a second converging lens 31 defines a corresponding opening of chamber 26. A more detailed description of the cell assembly will be set forth hereinafter. The components thus far described are arranged so that aperture 16 is at the effective principal focus of lens 29. In this manner a narrow beam of parallel light enters chamber 27 and emerges from chamber 26 through lens 31 after passing through diagonal plate 28.

The light emerging from lens 31 is twice reflected by prisms 32 and 33 mounted upon rotatable assembly 34 which is pivoted at point 36. From prism 33, the light beam passes through prism 37 so disposed that the light beam normally strikes the apex in a line perpendicular to its base. A radiation detector unit comprising first and second photovoltaic cells 38 and 39 is positioned so that the light beam striking the apex of prism 37 normally impinges equally upon adjacently positioned cells 38 and 39. The output of cells 38 and 39 are connected in opposition by means of electrical leads so as to produce a resulting voltage proportional to the difference in total radiation incident upon the two cells. The voltage appearing between leads 41 and 42 is amplified by an amplifier 43, the output of which is applied to a reversible motor 44. The shaft of motor 44 carries a gear 46 which engages a second gear 47. Gear 47 carries a pointer 48 mounted to indicate the degree of rotation of motor 44 produced by the output electrical signal from amplifier 43. Rotatable assembly 34 has an arm 49 which is attached to a cable 51. Cable 51 passes about suitable support posts 52, 53, and 54 and is wrapped about shaft 56 attached to gear 47. Thus rotation of gear 47 in response to the output signal from amplifier 43 moves cable 51 so as to rotate assembly 34 about pivot point 36.

If the refractive indexes of the fluids contained in chambers 26 and 27 are equal, the light beam emerging from cell assembly 17 is in optical alignment with the light beam entering the cell assembly. The instrument is initially positioned so that an undeviated light beam strikes the apex of prism 37 and is directed in equal intensities upon cells 38 and 39. If, however, the refractive indexes of the two fluids differ from one another, the emerging light beam is deviated in one direction or the other by cell assembly 17 so that a greater intensity of radiation is incident upon either cell 38 or cell 39. This in turn causes an unbalanced voltage which, after amplification, drives motor 44. The rotation of motor 44 in turn drives shaft 56, thus rotating rotatable assembly 34 and prisms 32 and 33 mounted thereon through the connecting linkage cable 51. This rotation is such as to deviate the light beam in the opposite direction and continues as long as unequal intensities of radiation are incident upon cells 38 and 39. The degree of this rotation, as indicated by pointer 48, is the measure of the differences in refractive indexes between the two fluids in cell assembly 17.

Figure 2:
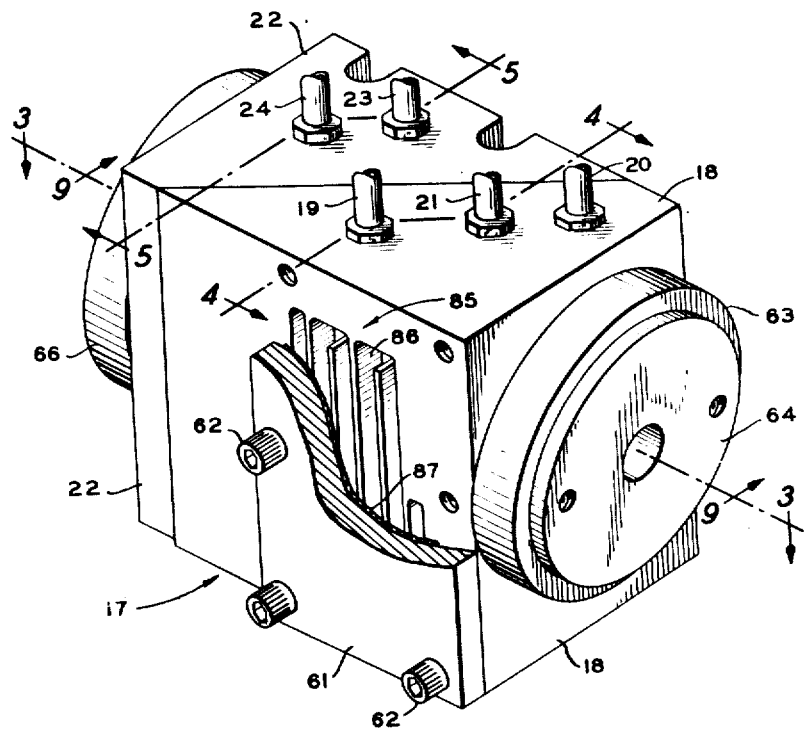
Figure 2 is a perspective view partly in section of the cell assembly according to this invention.

Referring to Figure 2 of the drawing there is illustrated the cell assembly 17 which was referred to in the description of Figure 1. While the cell assembly has been described in conjunction with a particular differential refractometer, it is not intended to so limit its use, but rather the cell assembly can be employed with any instrument whereby it is desired to compare the refractive indexes of two fluids. Cell assembly 17 comprises sample cell block 18 with which complementary standard cell block 22 cooperates. Standard cell block 22 is provided with inlet and outlet conduits 23 and 24, respectively, while sample cell block 18 is provided with inlet conduit 19 and outlet conduits 20 and 21. Plate 61, shown as partly cut away, is secured to sample cell block 18 by bolts 62, and covers vertical slots 85 cut in the side of the block. These slots are interconnected alternately at bottom and top so as to form a continuous passageway 86 for the circulation of the sample fluid. Annular member 63 is secured to sample cell block 18 by a plurality of screws, not shown, while collar 64 is attached to annular member 63 by suitable screws. Standard cell block 22 is also provided with a similar annular member 66 and a collar not shown. The annular members and collars have openings to permit the passage of a beam of light therethrough.

Referring to Figure 3 of the drawing, sample cell block 18 and standard cell block 22 are shown as defining chambers 26 and 27, respectively. Chamber 27 is closed at one end by a transparent window 67 mounted between standard cell block 22 and annular member 66 and provided with a sealing gasket 68 to prevent leakage of fluids from the interior of the cell unit. Chamber 26 within sample cell block 18 is closed by a similar window 69 mounted between the block and annular member 63 and provided with a sealing gasket 71. Annular members 63 and 66 are secured to the standard and sample cell blocks by a plurality of screws. The standard and sample cell blocks have interfitting portions 72 so that when assembled a rigid unitary structure is provided. A first convex lens 29 is mounted between collar 65 and annular member 66 while a second convex lens 31 is mounted between collar 64 and annular member 63. It is also within the contemplation of the invention to omit transparent windows 67 and 69 from the cell assembly in which case convex lenses 29 and 31, provided with suitable sealing gaskets, are held in position next to the cell blocks by annular members. A diagonal transverse plate 28 is mounted between sample cell block 18 and standard cell block 22 and is provided with sealing gaskets 73. Plate 28 thus serves to seal chambers 26 and 27, and prevent the passage of any fluid therebetween.

Chambers 26 and 27 are each provided with inlet and outlet means for the introduction and removal of fluids. A part only of the inlet means to chamber 27 is shown in Figure 3 and is designated by reference numeral 74. Chamber 26 is provided with an upper and a lower groove or gutter while chamber 27 is in this embodiment of the invention provided with an upper groove or gutter only. The lower gutter only of chamber 26 is shown in Figure 3, and is designated by reference numeral 76 while channel 80, communicating one end of passage way 86 with lower gutter 76, is shown in broken lines. The inlet and outlet means communicate with these gutters as will be described more in detail hereinafter.

The heat exchanger comprises vertical slots interconnected at top and bottom which are cut in the side of sample cell block 18 and when covered by plate 61 form a continuous passageway 86 through which fluid may circulate. Gasket 87 held in place by plate 61 in conjunction with screws 62 provides a positive seal. The fluid inlet means to chamber 26 communicates initially with one end of passageway 86 while the other end of passageway 86 communicates with channel 80 leading to lower gutter 76 of chamber 26. It is thus apparent that fluid before entering chamber 26 circulates through passageway 86 with the result that the fluid is brought to the temperature of the sample cell block.

Figures 4 and 5 are sectional views taken along the lines 4—4 and 5—5 of Figure 2 and show some of the details discussed hereinbefore. As shown in Figure 4, chamber 26 within sample cell block 18 may be generally circular in shape and is provided with an upper gutter 77 and a lower gutter 76 which extend longitudinally of the chamber. A first fluid outlet means 78 communicates with upper gutter 77 while a second fluid outlet means 75 leads from lower gutter 76. Fluid inlet means 79 leads to one end of passageway 86 of the heat exchanger while channel 80 communicates the other end of the same passageway with lower gutter 76. As illustrated in Figure 5, chamber 27 within standard cell block 22 may be generally oval in shape and is provided with an upper gutter 83 which extends longitudinally of the chamber. Fluid outlet means 84 communicates with upper gutter 83 while fluid inlet means 85 leads into one of the sides of chamber 27. Inlet conduit 19 and outlet conduits 20 and 21 of Figure 2 are connected to fluid inlet means 79 and fluid outlet means 75 and 78 of Figure 4, respectively, while inlet and outlet conduits 23 and 24 of Figure 2 are connected to fluid inlet means 85 and fluid outlet means 84 of Figure 5, respectively.

In the operation of the differential refractometer of Figure 1 employing the above described cell assembly, and referring particularly to Figure 4, a sample stream is continuously introduced into sample cell block 18 through fluid inlet means 79. After passing through the heat exchanger, the sample enters channel 80 and thereafter is introduced into chamber 26. The sample leaves chamber 26 through first and second fluid outlet means 78 and 75. Any phases lighter than the sample, such as air bubbles, which may be present in the fluid entering the chamber, accumulate in upper gutter 77 and are swept out of the chamber through outlet means 78. Furthermore, any phases heavier than the sample, such as water in a hydrocarbon sample, accumulate in lower gutter 76 and are removed from the chamber through fluid outlet means 75. In order to ensure fluid through both outlet means 75 and 78, flow regulating means can be provided in the outlet conduits connected thereto.

Referring to Figure 5, a standard sample is introduced into chamber 27 through fluid inlet means 85, and any lighter phases which may be present in the fluid collect in upper gutter 83 and pass out of the chamber through fluid outlet means 84. In this particular embodiment of the invention, the standard sample, after introduction into the chamber, is sealed therein. Because of the high degree of purity of the standard sample, it is unnecessary to provide for the removal of the heavier phases, thus making it possible to eliminate the lower gutter from chamber 27. It is apparent, however, that instead of the standard sample remaining static within chamber 27, a second sample can be circulated therethrough in the same manner as the sample within chamber 26. In this latter embodiment of the invention, chamber 27 is provided with a lower gutter and an additional fluid outlet means so as to remove any heavier material present. As illustrated in Figure 6, fluid inlet means 85 leads into lower gutter 90 while fluid outlet means 91 communicates with the same gutter at another point.

It is also within the contemplation of this invention to utilize a cell assembly comprising a sample cell block and a standard cell block both similar in construction to standard cell block 22 of Figure 6. Where it is desired to measure the differential in refractive indexes between two sample streams, this combination of cell blocks is especially adaptable. In such a case, the inlet conduits connected to the fluid inlet means of the two cell blocks are closely associated so that the two streams entering the standard and sample cell blocks are at substantially the same temperature.

The standard cell blocks as desribed above, by the inclusion of two fluid outlet means communicating with the upper and lower gutters, provide for the removal of phases both lighter and heavier than the sample. It is, however, within the contemplation of this invention to employ sample cell blocks adapted to the performance of only one of these operations. Thus, referring to Figure 7, there is illustrated a sectional view of sample cell block 18 suitable for the removal of a heavier phase. In this embodiment of the invention, channel 80 leads into upper gutter 77 while fluid outlet means 78 communicates with lower gutter 76. Any heavy material present in the sample stream collects in lower gutter 76 and passes out of the chamber through fluid outlet means 78.

Referring to Figure 8, there is illustrated a sectional view of cell block 18 adapted for the removal of phases lighter than the sample. In this embodiment of the invention, channel 80 leads into lower gutter 76 while fluid outlet means 78 communicates with upper gutter 77. Any lighter phases in the sample stream accumulate in upper gutter 77 and are swept out of the chamber through fluid outlet means 78.

It is also within the contemplation of this invention to use upper and lower gutters which are tapered. In this modification, as illustrated in Figure 9, the upper gutters 77 and 83 are tapered inwardly and upwardly from either end so that fluid outlet means 78 and 84 communicate with the gutters at their highest points. The lower gutters on the other hand are tapered inwardly and downwardly from either end, and, assuming that sample cell block 22 of Figure 6 is illustrated, fluid outlet means 75 and 91 lead into the gutters at their lowest points. In Figure 9, fluid outlet means 75 and fluid inlet means 85 are shown in broken lines, but it is to be understood that the fluid outlet means 91 and channel 80 communicate with the gutters at corresponding points along the length of the gutters. By utilizing this form of construction, the removal of the lighter phases through fluid outlet means 78 and 84 and the heavier phases through fluid outlet means 75 and 91 is facilitated. While this modification of the invention has been described with reference to sample and standard cell blocks similar to those shown in Figures 4 and 6, it is to be understood that tapered gutters can be employed with any of the cell blocks hereinbefore described.

In illustrating the cell blocks of this invention, the fluid outlet means and the fluid inlet means or channel 80, as applicable, are shown as communicating with either the upper or lower gutters. An exception occurs in the case of standard cell block 22 of Figure 5 where fluid inlet means 85 leads into the side of chamber 27. As to the fluid outlet means, it is important, if the chambers are to be sufficiently purged of unwanted phases, that they be so located. And furthermore, when tapered gutters are employed, the fluid outlet means should communicate with the gutters at about their high or low points as described. While it is preferred that the fluid inlet means or channel 80, as applicable, lead into the upper and lower gutters at points located at a substantial distance from the points where the outlet means communicate with the same gutters in order to promote purging of the unwanted phases, it is not intended to so limit their disposition. Accordingly, it is within the contemplation of the invention to have the fluid inlet means or channel 80 communicate with the side of the chambers in a manner similar to that shown in Figure 5. And furthermore, while the points at which the outlet means and the inlet means or channel 80 lead into the lower gutters should not be opposite one another for most satisfactory operation, it is apparent that the distance between the points can vary considerably, limited only by the details of construction, without departing from the spirit of the invention.

With respect to temperature control, it is pointed out that an increase or decrease in the temperature of the cell assembly as a whole does not materially affect the deflection of the light beam passing therethrough. On the other hand, even a small temperature differential between the fluids in the two chambers of the cell assembly may result in error. This invention incorporates several features which combine to facilitate the maintenance of the two fluids at a substantially equal temperature. The sample and standard cell blocks are made of a metal having good heat conducting properties and are constructed of massive size so as to serve as a heat reservoir. Since the sample and standard cell blocks are interconnected, the two blocks will be maintained at substantially the same temperature. As previously discussed, by means of the heat exchanger associated with the sample cell block, the sample fluid is brought to the same temperature as that of the block. Referring to Figure 5 of the drawing, it is seen that the chamber of the standard cell block is generally oval in shape. By employing a chamber of oval cross section, it is possible to reduce the volume of the chamber without impairing the optical effects produced on the light beam passing therethrough. By having a chamber of reduced volume, the accumulation of an unduly large sample in the chamber is avoided, and there is a sufficient heat transfer between the standard cell block and the small amount of fluid present in the chamber to maintain the fluid at the same temperature as that of the block. Thus the two fluids in the two chambers remain at substantially the same temperature.

As is evident from Figures 1 and 2, the central part of the cell block makes an angle, approximately 50° as illustrated, with respect to the center line. It is within the contemplation of this invention to employ other sets of sample and standard cell blocks which differ from each other in that the angle of the central portion with the center line varies. For example, the angle can be 4° or 13°. This permits the use of a cell assembly adapted to the refractive characteristics of the particular process stream under consideration, and also is useful in increasing the sensitivity of the instrument to changes in the refractive index of the stream being analyzed.

In describing the cell assembly, no mention has been made as to the manner in which the standard and sample cell blocks are held together. It will be understood, however, that suitable bolts are provided which pass through both cell blocks, and serve to fasten them firmly and rigidly together.

As will be evident to those skilled in the art, various modifications of this invention can be made or followed in the light of the foregoing disclosure and discussion without departing from the scope or spirit of the disclosure.

I claim:

1. A cell assembly for a differential refractometer which comprises, in combination, first and second cell blocks fitted together along tapered surfaces; passageways having a common longitudinal axis extending through said first and second cell blocks; transparent means for closing the ends of said passageways; upper and lower gutters cut in the top and bottom of the passageway of said first cell block; at least an upper gutter cut in the top of the passageway of said second cell block; fluid inlet means leading to the lower gutter of said first cell block passageway; a first fluid outlet means leading from the upper gutter of said first cell block passageway; a second fluid outlet means leading from the lower gutter of said first cell block passageway; fluid inlet means communicating with the passageway of said second cell block; and fluid outlet means leading from the upper gutter of said second cell block passageway.

2. The cell assembly of claim 1 wherein the angle formed by the tapered surfaces and the longitudinal axis of said cell blocks is about 50°.

3. The cell assembly of claim 1 wherein the angle formed by the tapered surfaces and the longitudinal axis of said cell blocks is about 13°.

4. The cell assembly of claim 1 wherein the angle formed by the tapered surfaces and the longitudinal axis of said cell blocks is about 4°.

5. A cell assembly for a differential refractometer which comprises, in combination, a sample cell block and a standard cell block, said cell blocks being fitted together along surfaces tapered at the same angle; passageways having a common longitudinal axis extending through said cell blocks; transparent means for closing the ends of said passageways; upper and lower gutters cut in the top and bottom of the sample cell block passageway and an upper gutter cut in the top of the standard cell block passageway; fluid inlet means leading to the lower gutter of said sample cell block passageway; a first outlet means leading from the upper gutter of said sample cell block passageway; a second fluid outlet means leading from the lower gutter of said sample cell block passageway; fluid inlet means leading to said standard cell block passageway; and fluid outlet means leading from the upper gutter of said standard cell block passageway.

6. The cell assembly of claim 5 wherein said upper gutters are tapered inwardly and upwardly and said lower gutter is tapered inwardly and downwardly from the ends of said passageways; said fluid inlet means leads to the lower gutter of said sample cell block passageway; said first fluid outlet means leads from the high point of the upper gutter of said sample cell block passageway; said second fluid outlet means leads from the low point of the lower gutter of said sample cell block passageway; said fluid inlet means leads to said standard cell block passageway; and said fluid outlet means leads from the high point of the upper gutter of said standard cell block passageway.

7. A cell assembly for a differential refractometer which comprises, in combination, a sample cell block and a standard cell block, said cell blocks being fitted together along surfaces tapered at the same angle; a passageway extending through said sample cell block and a passageway extending through said standard cell block, said passageways having a common longitudinal axis; transparent means for closing the ends of said passageways; an upper and a lower gutter cut in the top and bottom of each of said passageways; fluid inlet means leading to the lower gutter of the sample cell block passageway; fluid outlet means leading from the upper gutter of said sample cell block passageway; fluid outlet means leading from the lower gutter of said sample cell block passageway; fluid inlet means leading to the lower gutter of the standard cell block passageway; fluid outlet means leading from the upper gutter of said standard cell block passageway; and fluid outlet means leading from the lower gutter of said standard cell block passageway.

8. The cell assembly of claim 7 wherein said upper gutters are tapered inwardly and upwardly and said lower gutters are tapered inwardly and downwardly from the ends of said passageways; said fluid inlet means leads to the lower gutter of said sample cell block passageway; said fluid outlet means leads from the high point of the upper gutter of said sample cell block passageway; said fluid outlet means leads from the low point of the lower gutter of said sample cell block passageway; said fluid inlet means leads to the lower gutter of said standard cell block passageway; said fluid outlet means leads from the high point of the upper gutter of said standard cell block passageway; and said fluid outlet means leads from the low point of the lower gutter of said standard cell block passageway.

9. A cell assembly for a differential refractometer which comprises, in combination, a sample cell block and a standard cell block, said cell blocks being fitted together along surfaces tapered at the same angle; passageways having a common longitudinal axis extending through said cell blocks; transparent means for closing the ends of said passageways; upper and lower gutters cut in the top and bottom of the sample cell block passageway and an upper gutter cut in the top of the standard cell block passageway; fluid inlet means leading to the lower gutter of said sample cell block passageway; fluid outlet means leading from the upper gutter of said sample cell block passageway; fluid inlet means leading to said standard cell block passageway; and fluid outlet means leading from the upper gutter of said standard cell block passageway.

10. The cell assembly of claim 9 wherein said upper gutters are tapered inwardly and upwardly and said lower gutter is tapered inwardly and downwardly from the ends of said passageways; said fluid inlet means leads to the low point of the lower gutter of said sample cell block passageway; said fluid outlet means leads from the high point of the upper gutter of said sample cell block passageway; said fluid inlet means leads to said standard cell block passageway; and said fluid outlet means leads from the high point of the upper gutter of said standard cell block passageway.

11. A cell assembly for a differential refractometer which comprises, in combination, a sample cell block and a standard cell block, said cell blocks being fitted closely together along surfaces tapered at the same angle; a passageway extending through said sample cell block and a passageway extending through said standard cell block, said passageways having a common longitudinal axis; transparent means for closing the ends of said passageways; an upper and a lower gutter cut in the top and bottom of the sample cell block passageway; an upper gutter cut in the top of the standard cell block passageway; fluid inlet means leading to the upper gutter of said sample cell block passageway; fluid outlet means leading from the lower gutter of said sample cell block passageway; fluid inlet means leading to said standard cell block passageway; and fluid outlet means leading from the upper gutter of said standard cell block passageway.

12. The cell assembly of claim 11 wherein said upper gutters are tapered inwardly and upwardly and said lower gutter is tapered inwardly and downwardly from the ends of said passageways; said fluid inlet means leads to the high point of the upper gutter of said sample cell block passageway; said fluid outlet means leads from the low point of the lower gutter of said sample cell block passageway; said fluid inlet means leads to said standard cell block passageway; and said fluid means leads from the high point of the upper gutter of said standard cell block passageway.

13. A cell assembly for a differential refractometer which comprises, in combination, a sample cell block and a complementary standard cell block, said cell blocks being fitted closely together along surfaces tapered at the same angle; a passageway extending through said sample cell block and a passageway extending through said standard cell block, said passageways having a common longitudinal axis; an upper and a lower gutter cut in the top and bottom of the passageway within said sample cell block; an upper gutter cut in the top of the passageway within said standard cell block; fluid inlet means leading to the lower gutter of said sample cell block passageway; fluid outlet means leading from the upper gutter of said sample cell block passageway; fluid outlet means leading from the lower gutter of said sample cell block passageway; fluid inlet means leading to said standard cell block passageway; fluid outlet means leading from the upper gutter of said standard cell block passageway; a plate of transparent material disposed between said sample and standard cell blocks; a first transparent window positioned at the end of said standard cell block so as to form a sealed chamber within said block; a first convex lens positioned adjacent to and outside of said first transparent window; a second transparent window positioned at the end of said sample cell block so as to form a sealed chamber within said block; and a second convex lens positioned adjacent to and outside of said second transparent window.

14. The cell assembly of claim 13 wherein the passageway within said standard cell block has a lower gutter as well as an upper gutter and the fluid inlet means leads to said lower gutter and an additional fluid outlet means leads from said lower gutter.

15. A cell assembly for a differential refractometer which comprises, in combination, a sample cell block and a complementary standard cell block, said cell blocks being fitted closely together along surfaces tapered at the same angle; a passageway extending through said sample cell block and a passageway extending through said standard cell block, said passageways having a common longitudinal axis; an upper and a lower gutter cut in the top and bottom of the passageway within said sample cell block; an upper gutter cut in the top of the passageway within said standard cell block; fluid inlet means leading to the lower gutter of said sample cell block passageway; fluid outlet means leading from the upper gutter of said sample cell block passageway; fluid outlet means leading from the lower gutter of said sample cell block passageway; fluid inlet means leading to said standard cell block passageway; fluid outlet means leading from the upper gutter of said standard cell block passageway; a plate of transparent material disposed between said sample and standard cell blocks; a first convex lens positioned at the end of said standard cell block so as to form a sealed chamber within said cell block; and a second convex lens positioned at the end of said sample cell block so as to form a sealed chamber within said block.

16. A cell assembly for a differential refractometer which comprises, in combination, a sample cell block and a complementary standard cell block, said blocks being fitted closely together along surfaces tapered at the same angle; a passageway extending through said sample cell block and a passageway extending through said standard cell block, said passageways having a common longitudinal axis; an upper and a lower gutter cut in the top and bottom of the passageway within said sample cell block; an upper gutter cut in the top of the passageway within said standard cell block; fluid inlet means leading to a heat exchange means associated with said sample cell block and means for passing fluid from said heat exchange means to the lower gutter of said sample cell block passageway; fluid outlet means leading from the upper gutter of said sample cell block passageway; fluid outlet means leading from the lower gutter of said sample cell block passageway; fluid inlet means leading to said standard cell block passageway; fluid outlet means leading from the upper gutter of said standard cell block passageway; a plate of transparent material disposed between said sample and standard cell blocks; a first transparent window positioned at the end of said standard cell block so as to form a sealed chamber within said block; a first convex lens positioned adjacent to and outside of said first transparent window; a second transparent window positioned at the end of said sample cell block so as to form a sealed chamber within said block; and a second convex lens positioned adjacent to and outside of said second transparent window.

17. The cell assembly of claim 16 wherein the passageway within said standard cell block has a lower gutter as well as an upper gutter and the fluid inlet means leads to said lower gutter and an additional fluid outlet means leads from said lower gutter.

18. A cell assembly for a differential refractometer which comprises, in combination, a sample cell block and a complementary standard cell block, said blocks each having a central surface tapered at the same angle with respect to their common center line so as to fit closely in contact with one another; a passageway extending longitudinally through said cell blocks, the portion of said passageway within said sample cell block having a generally circular cross section and the portion of said passageway within said standard cell block having a generally oval cross section; an upper and a lower gutter cut in the top and bottom of the passageway within said sample cell block; an upper gutter cut in the top of the passageway within said standard cell block; a heat exchanger comprising a series of substantially vertical slots cut in the side of said sample cell block, the ends of said slots being interconnected alternately at bottom and top so as to form a continuous passage in the side of said sample cell block when covered with a plate secured to said side; a fluid inlet means in the top of said sample cell block, said means communicating with the upstream end of the passage of said heat exchanger and a channel within said sample cell block extending from the downstream end of the passage of said heat exchanger to the lower gutter in the bottom of the passageway within said sample cell block; a first fluid outlet means in the top of said sample cell block, said means communicating with the upper gutter in the top of the passageway within said sample cell block; a second fluid outlet means in the top of said sample cell block, said means communicating with the lower gutter in the bottom of the passageway within said sample cell block; a fluid inlet means in the top of said standard cell block, said means communicating with the passageway within said standard cell block; a fluid outlet means in the top of said standard cell block, said means communicating with the upper gutter in the top of the passageway within said standard cell block; a diagonal transverse plate of transparent material mounted between said sample and standard cell blocks, said plate being provided with sealing gaskets; a transparent window mounted between said standard cell block and an annular member secured to the end of said block to form a sealed chamber within said block, said window being provided with a sealing gasket; a first convex lens mounted between said annular member secured to said standard cell block and a collar secured to said annular member; a transparent window mounted between said sample cell block and an annular member secured to the end of said block to form a sealed chamber within said block, said window being provided with a sealing gasket; and a second convex lens mounted between the annular member secured to said sample cell block and a collar secured to said annular member.

19. The cell assembly of claim 18 wherein said upper gutters are tapered inwardly and upwardly and said lower gutter is tapered inwardly and downwardly from the ends of said passageways; said first fluid outlet means in the top of said sample cell block leads from the high point of the upper gutter of the sample cell block passageway; said second fluid outlet means in the top of said sample cell block leads from the low point of the lower gutter of the sample cell block passageway; and said fluid outlet means in the top of said standard cell block leads from the high point of the upper gutter of the standard cell block passageway.

20. A cell assembly for a differential refractometer which comprises, in combination, a sample cell block and a complementary standard cell block, said cell blocks each having a central surface tapered at the same angle with respect to their common center line so as to fit closely in contact with one another; a passageway extending longitudinally through said cell blocks, the portion of said passageway within said sample cell block having a generally circular cross section and the portion of said passageway within said standard cell block having a generally oval cross section; an upper and a lower gutter cut in the top and bottom of the passageway within said sample cell block; an upper and a lower gutter cut in the top and bottom of the passageway within said standard cell block; a heat exchanger comprising a series of substantially vertical slots cut in the side of said sample cell block, the ends of said slots being interconnected alternately at top and bottom so as to form a continuous passage in the side of said sample cell block when covered with a plate secured to said side; a fluid inlet means in the top of said sample cell block, said means communicating with the upstream end of the passage of said heat exchanger and a channel within said sample cell block extending from the downstream end of the passage of said heat exchanger to the lower gutter in the bottom of the passageway within said sample cell block; a first fluid outlet means in the top of said sample cell block, said means communicating with the upper gutter in the top of the passageway within said sample cell block; a second fluid outlet means in the top of said sample cell block, said means communicating with the lower gutter in the bottom of the passageway within said sample cell block; a fluid inlet means in the top of said standard cell block, said means communicating with the lower gutter of the passageway within said standard cell block; a first fluid outlet means in the top of said standard cell block, said means communicating with the upper gutter in the top of the passageway within said standard cell block; a second fluid outlet means in the top of said standard cell block, said means communicating with the lower gutter in the bottom of the passageway within said standard cell block; a diagonal transverse plate of transparent material mounted between said sample and standard cell blocks, said plate being provided with a sealing gasket on either of its sides; a transparent window mounted between said standard cell block and an annular member secured to the end of said block to form a sealed chamber within said block, said window being provided with a sealing gasket; a first convex lens mounted between said annular member secured to said standard cell block and a collar secured to said annular member; a transparent window mounted between said sample cell block and an annular member secured to the end of said block to form a sealed chamber within said block, said window being provided with a sealing gasket; a second convex lens mounted between said annular member secured to said sample cell block and a collar secured to said annular member; and means for holding said sample and standard cell blocks rigidly and securely together.

21. The cell assembly of claim 20 wherein the upper gutters are tapered inwardly and upwardly and the lower gutters are tapered inwardly and downwardly from the ends of said passageways; said first outlet means in the top of said sample cell block leads from the high point of the upper gutter of the sample cell block passageway; said second fluid outlet means in the top of said sample cell block leads from the low point of the lower gutter of the sample cell block passageway; said first fluid outlet means in the top of said standard cell block leads from the high point of the upper gutter of the standard cell block passageway; and said second fluid outlet means in the top of said standard cell block leads from the low point of the lower gutter of the standard cell block passageway.

22. A cell block for use in a cell assembly for a differential refractometer which comprises a metallic block having one of its surfaces tapered at an oblique angle; a passageway extending longitudinally through said block and intersecting the tapered surface of said block; transparent means for closing the ends of said passageway; an upper and a lower gutter cut in the top and bottom of said passageway; a heat exchange means comprising a series of substantially vertical slots cut in the side of said block, the ends of said slots being interconnected alternately at bottom and top so as to form a continuous passage in the side of said block when covered with a plate secured to said side; a fluid inlet means communicating with the upstream end of the passage of said heat exchange means and a channel within said block extending from the downstream end of the passage of said heat exchange means to said lower gutter; a first fluid outlet means communicating with said upper gutter; and a second fluid outlet means communicating with said lower gutter.

23. The cell block of claim 22 wherein said upper gutter is tapered inwardly and upwardly and said lower gutter is tapered inwardly and downwardly from the ends of said passageway; said first fluid outlet means leads from the high point of said upper gutter; and said second fluid outlet means leads from the low point of said lower gutter.

24. A cell block for use in a cell assembly for a differential refractometer which comprises a metallic block having one of its surfaces tapered at an oblique angle; a passageway extending longitudinally through said block and intersecting the tapered surface of said block; transparent means for closing the ends of said passageway; an upper and a lower gutter cut in the top and bottom of said passageway; a heat exchange means comprising a series of substantially vertical slots cut in the side of said block, the ends of said slots being interconnected alternately at bottom and top so as to form a continuous passage in the side of said block when covered with a plate secured to said side; a fluid inlet means communicating with the upstream end of the passage of said heat exchange means and a channel within said block extending from the downstream end of the passage of said heat exchange means to said lower gutter; and a fluid outlet means leading from said upper gutter.

25. The cell block of claim 24 wherein said upper gutter is tapered inwardly and upwardly and said lower gutter is tapered inwardly and downwardly from the ends of said passageway; said channel leads to the low point of said lower gutter; and said fluid outlet means leads from the high point of said upper gutter.

26. A cell block for use in a cell assembly for a differential refractometer which comprises a metallic block having one of its surfaces tapered at an oblique angle; a passageway extending longitudinally through said block and intersecting the tapered surface of said block; transparent means for closing the ends of said passageway; an upper and a lower gutter cut in the top and bottom of said passageway; a heat exchange means comprising a series of substantially vertical slots cut in the side of said block, the ends of said slots being interconnected alternately at bottom and top so as to form a continuous passage in the side of said block when covered with a plate secured to said side; a fluid inlet means communicating with the upstream end of the passage of said heat exchange means and a channel within said block extending from the downstream end of the passage of said heat exchange means to said upper gutter, and a fluid outlet means leading from said lower gutter.

27. The cell block of claim 26 wherein said upper gutter is tapered inwardly and upwardly and said lower gutter is tapered inwardly and downwardly from the ends of said passageway; said channel leads to the high point of said upper gutter; and said fluid outlet means leads from the low point of said lower gutter.

28. A cell block for use in a cell assembly for a differential refractometer which comprises a block having one of its surfaces tapered at an oblique angle; a passageway extending longitudinally through said block and intersecting the tapered surface of said block; transparent means for closing the ends of said passageway; an upper gutter cut in the top of said passageway; fluid inlet means communicating with said passageway; and fluid outlet means leading from said upper gutter.

29. The cell block of claim 28 wherein said upper gutter is tapered inwardly and upwardly from the ends of said passageway and said fluid outlet means leads from the high point of said upper gutter.

30. A cell block for use in a cell assembly for a differential refractometer which comprises a metallic block having one of its surfaces tapered at an oblique angle; a passageway extending longitudinally through said block and intersecting the tapered surface of said block; transparent means for closing the ends of said passageways; an upper and a lower gutter cut in the top and bottom of said passageway; fluid inlet means leading to said lower gutter; a first fluid outlet means leading from said upper gutter; and a second fluid outlet means leading from said lower gutter.

31. The cell block of claim 30 wherein said upper gutter is tapered inwardly and upwardly and said lower gutter is tapered inwardly and downwardly from the ends of said passageway; said first fluid outlet means leads from the high point of said upper gutter; and said second fluid outlet means leads from the low point of said lower gutter.

32. A cell assembly for a differential refractometer which comprises, in combination, a sample cell block and a standard cell block, said cell blocks being fitted together along surfaces tapered at the same angle; passageways having a common longitudinal axis extending through said cell blocks; transparent means for closing the ends of said passageways; upper and lower gutters cut in the top and bottom of the sample cell block passageway; upper and lower gutters cut in the top and bottom of the standard cell block passageway; fluid inlet means leading to the lower gutter of said sample cell block passageway; fluid outlet means leading from the upper gutter of said sample block passageway; fluid inlet means leading to the lower gutter of said standard cell block passageway; fluid outlet means leading from the upper gutter of said standard cell block passageway; and fluid outlet means leading from the lower gutter of said standard cell block passageway.

33. The cell assembly of claim 32 wherein said upper gutters are tapered inwardly and upwardly and said lower gutters are tapered inwardly and downwardly from the ends of said passageway; said fluid inlet means leads to the low point of the lower gutter of said sample cell block passageway; said fluid outlet means leads from the high point of the upper gutter of said sample cell block passageway; said fluid inlet means leads to the lower gutter of said standard cell block passageway; said fluid outlet means leads from the high point of the upper gutter of said standard cell block passageway; and said fluid outlet means leads from the low point of the lower gutter of said standard cell block passageway.

34. A cell assembly for a differential refractometer which comprises, in combination, a sample cell block and a complementary standard cell block, said cell blocks each having a central surface tapered at the same angle with respect to their common center line so as to fit closely in contact with one another; a passageway extending longitudinally through said cell blocks, the portion of said passageway within said sample cell having a generally circular cross section and the portion of said passageway within said standard cell block having a generally oval cross section; an upper and a lower gutter cut in the top and bottom of the passageway within said sample cell block; an upper and a lower gutter cut in the top and bottom of the passageway within said standard cell block; a heat exchanger comprising a series of substantially vertical slots cut in the side of said sample cell block, the ends of said slots being interconnected alternately at top and bottom so as to form a continuous passage in the side of said sample cell block when covered with a plate secured to said side; a fluid inlet means in the top of said sample cell block, said means communicating with the upstream end of the passage of said heat exchanger and a channel within said sample cell block extending from the downstream end of the passage of said heat exchanger to the lower gutter in the bottom of the passageway within said sample cell block; a fluid outlet means in the top of said sample cell block, said means communicating with the upper gutter in the top of the passageway within said sample cell block; a fluid inlet means in the top of said standard cell block, said means communicating with the lower gutter of the passageway within said standard cell block; a first fluid outlet means in the top of said standard cell block, said means communicating with the upper gutter in the top of the passageway within said standard cell block; a second fluid outlet means in the top of said standard cell block, said means communicating with the lower gutter in the bottom of the passageway within said standard cell block; a diagonal transverse plate of transparent material mounted between said sample and standard cell blocks, said plate being provided with a sealing gasket on either of its sides; a transparent window mounted between said standard cell block and an annular member secured to the end of said block to form a sealed chamber within said block, said window being provided with a sealing gasket; a first convex lens mounted between said annular member secured to said standard cell block and a collar secured to said annular member; a transparent window mounted between said sample cell block and an annular member secured to the end of said block to form a sealed chamber within said block, said window being provided with a sealing gasket; a second convex lens mounted between said annular member secured to said sample cell block and a collar secured to said annular member; and means for holding said sample and standard cell blocks rigidly and securely together.

35. The cell assembly of claim 34 wherein said upper gutters are tapered inwardly and upwardly and said lower gutters are tapered inwardly and downwardly from the ends of said passageway; said fluid outlet means in the top of said sample cell block leads from the high point of the upper gutter of said sample cell block passageway; said first fluid outlet means in the top of said standard cell block leads from the high point of the upper gutter of said standard cell block passageway; and said second fluid outlet means leads in the top of said standard cell block from the low point of the lower gutter of said standard cell block passageway.

References Cited in the file of this patent
UNITED STATES PATENTS

| | | |
|---|---|---|
| 2,015,949 | Maw | Oct. 1, 1935 |
| 2,299,529 | Campton | Oct. 20, 1942 |
| 2,427,996 | Seaman | Sept. 23, 1947 |
| 2,612,814 | Glasser | Oct. 7, 1952 |
| 2,624,014 | Barstow | Dec. 30, 1952 |
| 2,686,454 | Ruska | Aug. 17, 1954 |

UNITED STATES PATENT OFFICE

CERTIFICATE OF CORRECTION

Patent No. 2,810,315                                  October 22, 1957

Elmer C. Miller

It is hereby certified that error appears in the printed specification of the above numbered patent requiring correction and that the said Letters Patent should read as corrected below.

Column 2, line 39, beginning with "Another" strike out all to and including "accuracy." in line 41, same column; column 5, line 42, after "fluid" insert --flow--; line 61, for "heavier" read --heavy--; column 6, line 53, for "sufficiently" read --efficiently--; column 7, line 30, for "block" read --blocks--; column 8, line 6, for "blcoks" read --blocks--; column 13, line 72, for "passageways" read --passageway--; column 14, line 22, after "sample" insert --cell--; column 16, line 17, list of references cited, for "Campton" read --Crampton--.

Signed and sealed this 21st day of January 1958.

(SEAL)
Attest:
KARL H. AXLINE

Attesting Officer

ROBERT C. WATSON
Commissioner of Patents